United States Patent
Teff et al.

(10) Patent No.: US 10,408,956 B1
(45) Date of Patent: Sep. 10, 2019

(54) RADIAL ANTI-AZIMUTHAL ALIASING ARRAY

(71) Applicant: Devon Energy Corporation, Oklahoma City, OK (US)

(72) Inventors: Joe Teff, Blanchard, OK (US); David Langton, Edmond, OK (US); Dan Kahn, Edmond, OK (US); Scott Saltus, Norman, OK (US)

(73) Assignee: Devon Energy Corporation, Oklahoma City, OK (US)

( * ) Notice: Subject to any disclaimer, the term of this patent is extended or adjusted under 35 U.S.C. 154(b) by 205 days.

(21) Appl. No.: 15/475,075

(22) Filed: Mar. 30, 2017

Related U.S. Application Data

(60) Provisional application No. 62/316,408, filed on Mar. 31, 2016.

(51) Int. Cl.
*G01V 1/00* (2006.01)
*G01V 1/28* (2006.01)
*G01V 1/42* (2006.01)

(52) U.S. Cl.
CPC .............. *G01V 1/288* (2013.01); *G01V 1/42* (2013.01); *G01V 2210/1234* (2013.01); *G01V 2210/1425* (2013.01)

(58) Field of Classification Search
CPC .. G01V 1/288; G01V 1/42; G01V 2210/1234; G01V 2210/1425
See application file for complete search history.

(56) References Cited

U.S. PATENT DOCUMENTS

| | | | | |
|---|---|---|---|---|
| 4,432,078 | A * | 2/1984 | Silverman | G01V 1/133 166/249 |
| 6,868,037 | B2 * | 3/2005 | Dasgupta | G01V 1/42 367/40 |
| 9,194,967 | B2 * | 11/2015 | Lacazette | G01V 1/288 |
| 9,395,456 | B2 * | 7/2016 | Diller | G01V 1/288 |
| 9,448,313 | B2 * | 9/2016 | Hofland | G01V 1/306 |
| 10,073,184 | B2 * | 9/2018 | Faber | G01V 1/42 |
| 2013/0100769 | A1 | 4/2013 | Riley et al. | |
| 2013/0100770 | A1 | 4/2013 | Diller et al. | |

OTHER PUBLICATIONS

Drill2Frac Brochure.

* cited by examiner

*Primary Examiner* — Krystine E Breier
(74) *Attorney, Agent, or Firm* — Crowe & Dunlevy, P.C.

(57) ABSTRACT

A microseismic array includes a series of sensors that are arranged in combinations of various sensor formations that collectively provide an improved radial anti-azimuthal aliasing function for microseismic mapping a wellbore. The sensors may be organized into one or more formations that resemble arms that extend radially outward from a central region around the wellbore, patches distributed in a field around the wellbore, ovals that are centered around the wellbore and concentric rings within the sensor ovals.

15 Claims, 5 Drawing Sheets

US 10,408,956 B1

RADIAL ANTI-AZIMUTHAL ALIASING ARRAY

RELATED APPLICATIONS

This application claims the benefit of United States Provisional Patent Application No. 62/316,408, filed on Mar. 31, 2016, entitled "Radial Anti-Azimuthal Aliasing Array," the disclosure of which is incorporated herein.

FIELD OF THE INVENTION

This invention relates generally to the field of hydraulic fracturing and more particularly, but not by way of limitation, to microseismic monitoring used in hydraulic fracturing.

BACKGROUND

Microseismic monitoring is sometimes used to estimate the size and orientation of geologic fractures induced during a hydraulic fracturing operation. Microseismic activity can be measured by placing an array of geophones on the surface surrounding the wellbore or underground in a nearby wellbore. By measuring and mapping the location of small seismic events associated with the growing fracture, the approximate geometry of the fracture can be estimated.

Microseismic analysis is used to provide useful information during the hydraulic fracturing operation and during the subsequent recovery period. The microseismic analysis can be used to quantify the growth of fracture-related stimulation in a reservoir by accurately determining the event hypocenter location. The microseismic analysis can also be used to identify the orientation of the maximum shear stress by calculating stress tensor through the determination of focal mechanisms projected on to the surface array deployment. In some cases, microseismic analysis can be used to estimate the volume expansion through the calculation of the moment tensor and to better understand the fault structure in region.

To accomplish these objectives from a surface-recorded method, it is necessary to have a thorough coverage of the focal sphere with the deployed sensors. In the past, a variety of geometrical arrays have been deployed, most prominently radial arrays (with arms radiating from a central location) as depicted in the drawing in FIG. 1, and patch arrays (with multiple sensors per patch to increase signal-to-noise ratio) as depicted in the drawing of FIG. 2.

Despite these advancements in array configurations, current surface-based microseismic mapping may lack the level of measurement resolution that is required by the technical demands of horizontal drilling and other modern hydrocarbon recovery efforts. The radial array suffers from the limiting azimuthal coverage and from the decrease in sensors further from the well. The patch array also fails to give complete coverage of the focal sphere and requires a large number of patches for its success. Accordingly, there is a need for an improved microseismic mapping system that overcomes the deficiencies of the prior art surface acquisition layout.

SUMMARY OF THE INVENTION

A microseismic array includes a series of sensors that are arranged in combinations of various sensor formations that collectively provide an improved radial anti-azimuthal aliasing function for microseismic mapping a wellbore. The sensors may be organized into one or more formations that resemble arms that extend radially outward from a central region around the wellbore, patches distributed in a field around the wellbore, ovals that are centered around the wellbore and concentric rings within the sensor ovals.

In one aspect, the present invention includes a microseismic analysis sensor array that is positioned about a wellbore that includes a wellhead, a bottom and a lateral component between the wellhead and bottom. The sensor array includes a first plurality of sensors that are arranged as arms extending outwards from the wellhead, a second plurality of sensors arranged in a plurality of sensor patches and a third plurality of sensors arranged in a first sensor oval centered about the lateral component of the wellbore.

In yet another aspect, the present invention includes a microseismic analysis sensor array positioned about a wellbore that includes a wellhead, a bottom and a lateral component between the wellhead and bottom. The sensor array includes a first plurality of sensors arranged as arms extending outwards from the wellhead, a second plurality of sensors arranged in a plurality of sensor patches, a third plurality of sensors arranged in a first sensor oval centered about the lateral component of the wellbore at a first distance, a fourth plurality of sensors arranged in a second sensor oval centered about the lateral component of the wellbore at a second distance that is less than the first distance and a fifth plurality of sensors arranged in a third sensor oval centered about the lateral component of the wellbore at a third distance that is greater than the second distance.

In yet another aspect, the present invention includes a microseismic analysis sensor array positioned about a wellbore that includes a wellhead, a bottom and a lateral component between the wellhead and bottom. The sensor array includes a first plurality of sensors arranged in a first sensor oval centered about the lateral component of the wellbore at a first distance and a second plurality of sensors arranged in a first series of sensor rings distributed within the first sensor oval.

WRITTEN DESCRIPTION

Figure 1:
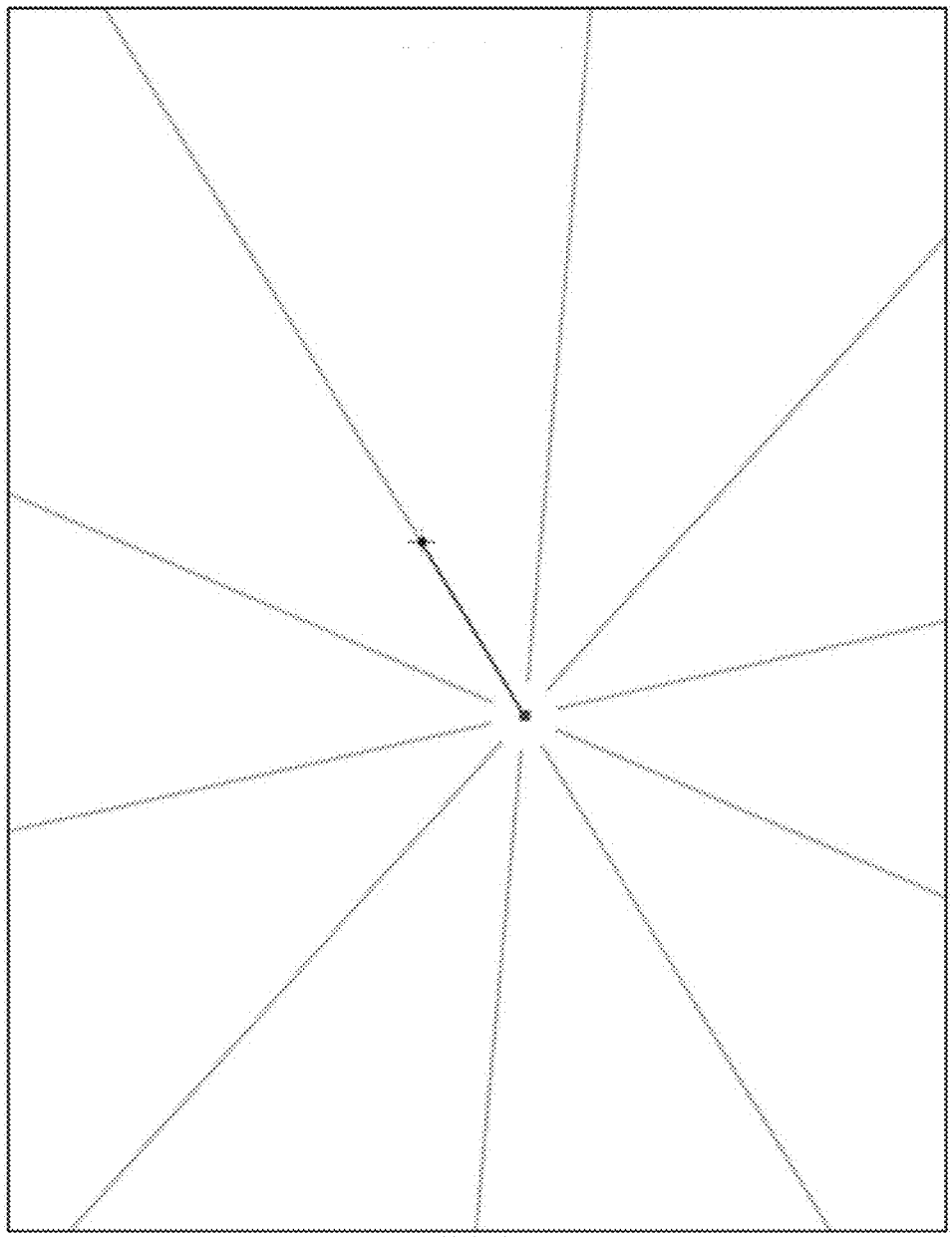
FIG. 1 is a map view of a standard prior art radial array.
Figure 2:
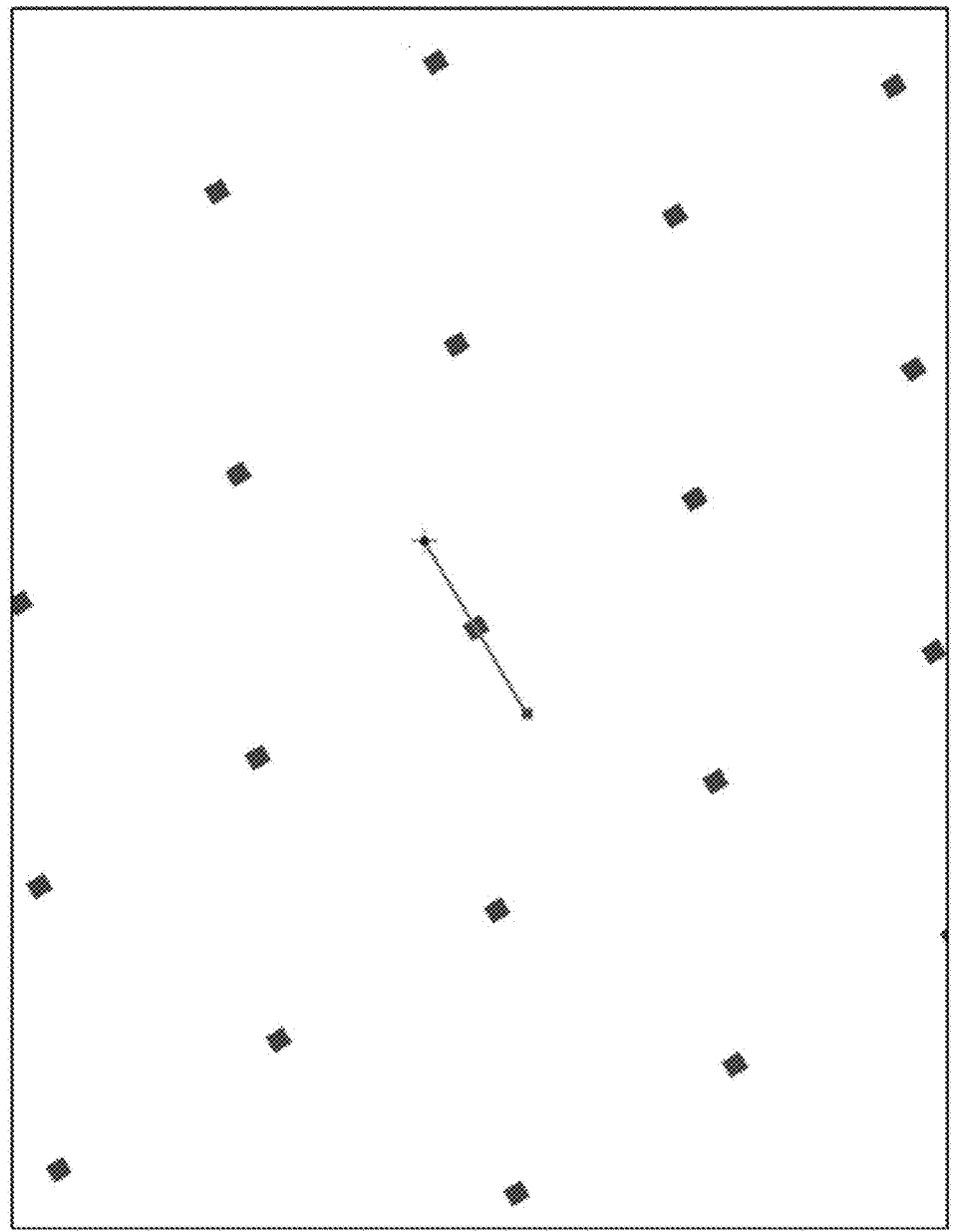
FIG. 2 is a map view of a standard prior art patch array.
Figure 3:
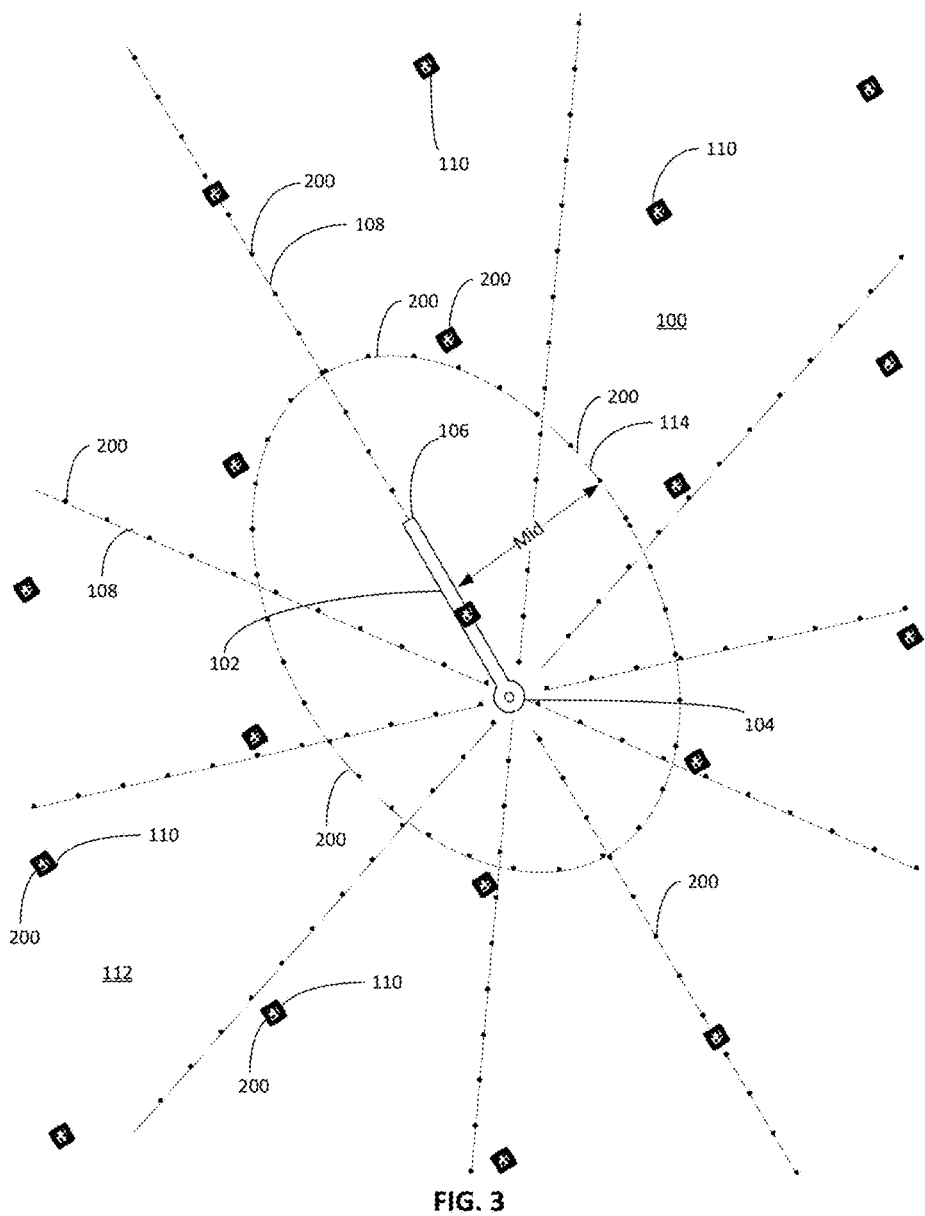
FIG. 3 is a map view of a combined radial/patch array with a single "mid" sensor oval.

Turning to FIG. 3, shown therein is a radial anti-azimuthal aliasing array 100 constructed in accordance with a presently preferred embodiment. The array 100 is positioned about a wellbore 102 that extends from a wellhead 104 to a bottom 106. As illustrated in FIG. 3, the wellbore 102 includes a lateral component that may extend at an inclination or horizontal orientation at a planned depth beneath the surface.

The array 100 includes a plurality of geophones 200 (not all designated) or other surface-mounted seismic sensors distributed in patterns around the wellbore 102. In this embodiment, the array 100 includes a first plurality of sensors 200 arranged in radial arms 108 extending from the wellhead 104 and a second plurality of sensors 200 arranged in a plurality of clusters or sensor patches 110. The plurality of sensor patches 110 are distributed in a patch pattern 112. In some embodiments, the patch pattern 112 is distributed in a substantially uniform, staggered pattern about the line of the wellbore 102 (as shown in FIG. 3) with corresponding pairs of sensor patches 110 equally spaced apart from the wellbore 102. The array 100 further includes a third plurality of sensors 200 arranged in a sensor oval 114. The sensor oval 114 is centered about the lateral of the wellbore 102 and aligned with the lateral. The sensor oval 114 may be configured as an ellipse, a general oval or a stadium.

The azimuthal symmetry of the sensor oval 114 about the lateral of the wellbore 102 reduces the potential for spatial aliasing as the wavefront passes through the array 100. The sensor oval 114 depicted in FIG. 3 is disposed at a "mid" distance from the wellbore 102. Thus, in a first embodiment, the sensor array 100 includes a first plurality of sensors 200 arranged in a plurality of radial arms 108, a second plurality of sensors 200 arranged in a plurality of sensor patches 110 and a third plurality of sensors 200 arranged in a sensor oval 114.

Figure 4:
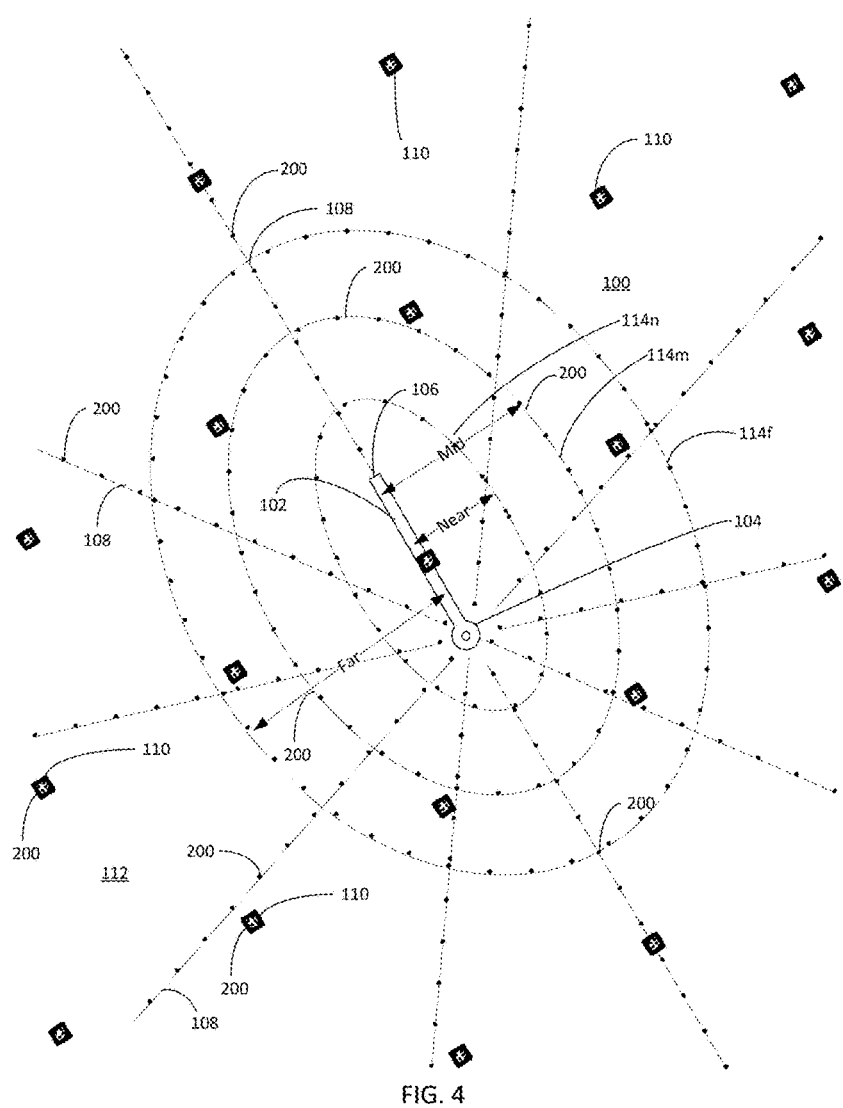
FIG. 4 is a map view of the array of FIG. 3 with the addition of "near" and "far" sensor ovals.

Turning to FIG. 4, shown therein is a second embodiment of the array 100 that includes a plurality of sensor ovals 114. As depicted in FIG. 4, the array includes three sensor ovals 114 distributed at near (114n), mid (114m) and far (114f) distances from the wellbore 102. The use of three sensor ovals 114 spaced apart from the wellbore 102 at different differences from the wellbore 102 provides sampling at different take-off angles to provide additional information about observed focal mechanism solutions.

Figure 5:
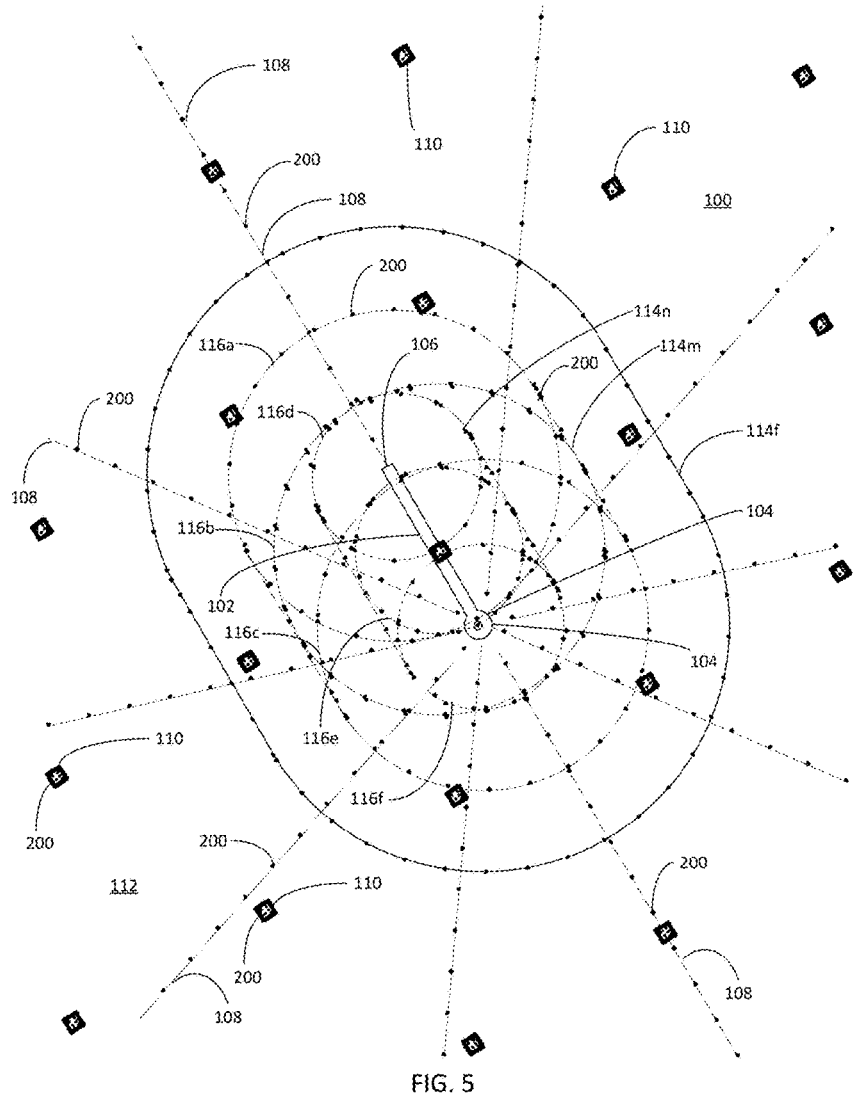
FIG. 5 is a map view of the array of FIG. 4 with the addition of concentric sensor rings.

Turning to FIG. 5, shown therein is a third embodiment of the array 100 that includes a series of sensor rings 116 distributed within the sensor ovals 114. In the embodiment depicted in FIG. 5, the array 100 includes six concentric sensor rings (116a-f) that are centered about the wellhead 102, bottom 106 and the midpoint of the wellbore 102 lateral. Three smaller sensor rings 116d, 116e and 116f are positioned within the "near" sensor oval 114n. The larger sensor rings 116a, 116b, and 116c are concentric with the smaller sensor rings 116d, 116e and 116f, respectively, and are located within the "mid" sensor oval 114m. The array 100 allows for more uniform coverage than that found in other geometrical arrays with far fewer sensors. In some applications, it may be helpful to deploy an additional set of larger sensors rings within the "far" sensor oval 114f. Such larger sensor rings could be concentric with the sensor rings 116a-116f.

In each of the embodiments depicted in FIGS. 3-5, the array 100 takes advantage of the azimuthal symmetry of the sensors 200 to allow for a determination of the nodes in the radiation pattern with less uncertainty in the accuracy and precision. The range of take-off angles provided by the array 100 yields a greater coverage of the focal sphere so that a more accurate determination of the moment tensor can be made. The array 100 also provides enhanced anti-aliasing properties that significantly improve the ability to locate hypocenters. The advantages provided by the array 100 improve the location of events during a hydraulic fracturing operation and enable a better determination of the direction of the maximum shear stress to give insight into the orientation of subsequent wells that will require less fluid pressure for hydraulic fracturing. Additionally, the symmetry and offset of the sensor locations in the array 100 provide better information about vertical and horizontal transverse isotropy (VTI & HTI). These advantages provide improved knowledge of opening and closing events that can be used to optimize the recovery of hydrocarbons from the wellbore 102.

As used herein, the term "radial arms" refers to a collection of sensors 200 distributed along straight or curved lines extending from a substantially common point. The term "sensor oval" refers to the collection of sensors 200 arranged in an oval pattern that may include formations that follow ellipse, stadium and other oval shapes. The term "sensor patches" refers to collections of sensors 200 that are group together and spaced apart from other sensor patches. The term "sensor rings" refers to a collection of sensors 200 that are distributed in a substantially circular formation.

Thus, in a first embodiment, the sensor array 100 includes a first plurality of sensors 200 arranged in a plurality of radial arms 108, a second plurality of sensors 200 arranged in a plurality of sensor patches 110 and a third plurality of sensors 200 arranged in a sensor oval 114.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts and steps within the principles of the present invention to the full extent indicated by the broad general meaning of the terms in which the embodiments are expressed. It will be appreciated by those skilled in the art that the teachings of the present invention can be applied to other systems without departing from the scope and spirit of the present invention.

It is claimed:

1. A microseismic analysis sensor array positioned about a wellbore that includes a wellhead, a bottom and a lateral component between the wellhead and bottom, the sensor array comprising:
   a first plurality of sensors, wherein the first plurality of sensors are arranged as arms extending outwards from the wellhead;
   a second plurality of sensors, wherein the second plurality of sensors are arranged in a plurality of sensor patches;
   a third plurality of sensors, wherein the third plurality of sensors are arranged in a first sensor oval centered about the lateral component of the wellbore at a first distance from the lateral component of the wellbore;
   a fourth plurality of sensors arranged in a second sensor oval centered about the lateral component of the wellbore at a second distance from the lateral component of the wellbore, wherein the second distance is less than the first distance;
   a fifth plurality of sensors arranged in a third sensor oval centered about the lateral component of the wellbore at a third distance from the lateral component of the wellbore, wherein the third distance is greater than the first distance; and
   sixth plurality of sensors arranged in a first series of sensor rings distributed within the second sensor oval.

2. The microseismic analysis sensor array of claim 1, wherein the first plurality of sensors are arranged in arms that are substantially linear and radiate from the wellhead in a substantially uniform pattern.

3. The microseismic analysis sensor array of claim 1, wherein the second plurality of sensors are arranged in a plurality of sensor patches that are distributed in a substantially uniform, staggered pattern.

4. The microseismic analysis sensor array of claim 1, further comprising a seventh plurality of sensors arranged in a second series of sensor rings distributed within the first sensor oval.

5. The microseismic analysis sensor array of claim 4, wherein each of the sensor rings of the first series of sensor rings is concentric with a corresponding one of the sensor rings in the second series of sensor rings.

6. A microseismic analysis sensor array positioned about a wellbore that includes a wellhead, a bottom and a lateral component between the wellhead and bottom, the sensor array comprising:
   a first plurality of sensors, wherein the first plurality of sensors are arranged as arms extending outwards from the wellhead;
   a second plurality of sensors, wherein the second plurality of sensors are arranged in a plurality of sensor patches;
   a third plurality of sensors, wherein the third plurality of sensors are arranged in a first sensor oval centered about the lateral component of the wellbore at a first distance;
   a fourth plurality of sensors, wherein the fourth plurality of sensors are arranged in a second sensor oval centered about the lateral component of the wellbore at a second distance that is less than the first distance;
   a fifth plurality of sensors, wherein the fifth plurality of sensors are arranged in a third sensor oval centered about the lateral component of the wellbore at a third distance that is greater than the second distance; and
   a sixth plurality of sensors arranged in a first series of sensor rings distributed within the second sensor oval.

7. The microseismic analysis sensor array of claim 6, further comprising a seventh plurality of sensors arranged in a second series of sensor rings distributed within the first sensor oval.

8. The microseismic analysis sensor array of claim 7, wherein each of the sensor rings of the first series of sensor rings is concentric with a corresponding one of the sensor rings in the second series of sensor rings.

9. A microseismic analysis sensor array positioned about a wellbore that includes a wellhead, a bottom and a lateral component between the wellhead and bottom, the sensor array comprising:
   a first plurality of sensors, wherein the first plurality of sensors are arranged in a first sensor oval centered about the lateral component of the wellbore at a first distance; and
   a second plurality of sensors, wherein the second plurality of sensors are arranged in a first series of sensor rings distributed within the first sensor oval.

10. The microseismic analysis sensor array of claim 9, further comprising a third plurality of sensors, wherein the third plurality of sensors are arranged in a second sensor oval centered about the lateral component of the wellbore at a second distance that is less than the first distance.

11. The microseismic analysis sensor array of claim 10, further comprising a fourth plurality of sensors, wherein the fourth plurality of sensors are arranged in a second series of sensor rings distributed within the second sensor oval.

12. The microseismic analysis sensor array of claim 11, wherein each of the sensor rings of the first series of sensor rings is concentric with a corresponding one of the sensor rings in the second series of sensor rings.

13. The microseismic analysis sensor array of claim 11, further comprising a fifth plurality of sensors, wherein the fifth plurality of sensors are arranged as arms extending outwards from the wellhead.

14. The microseismic analysis sensor array of claim 13, wherein the fifth plurality of sensors are arranged in arms that are substantially linear and radiate from the wellhead in a substantially uniform pattern.

15. The microseismic analysis sensor array of claim 13, further comprising a sixth plurality of sensors, wherein the sixth plurality of sensors are arranged in a plurality of sensor patches.

* * * * *